No. 826,097. PATENTED JULY 17, 1906.
A. FRANTZEN & W. H. RATTENBURY.
CONDUIT OUTLET BOX.
APPLICATION FILED MAR. 24, 1903.
2 SHEETS—SHEET 1.
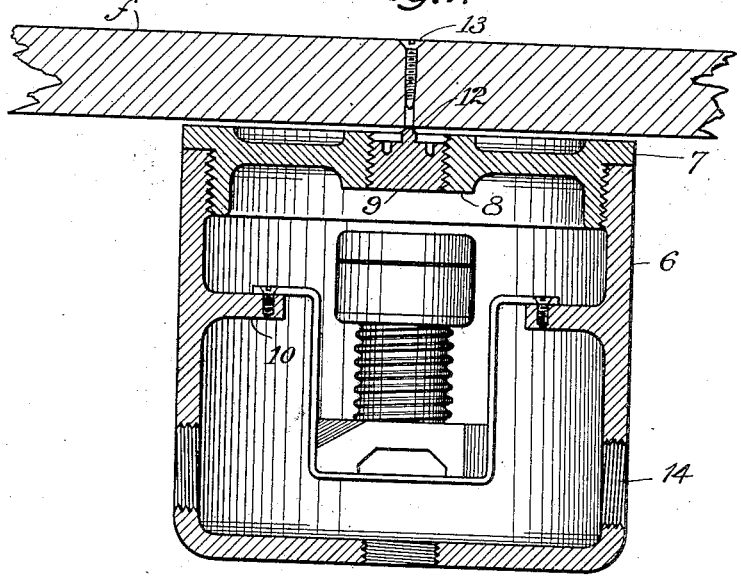
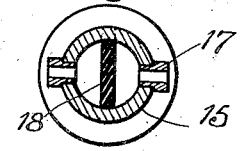
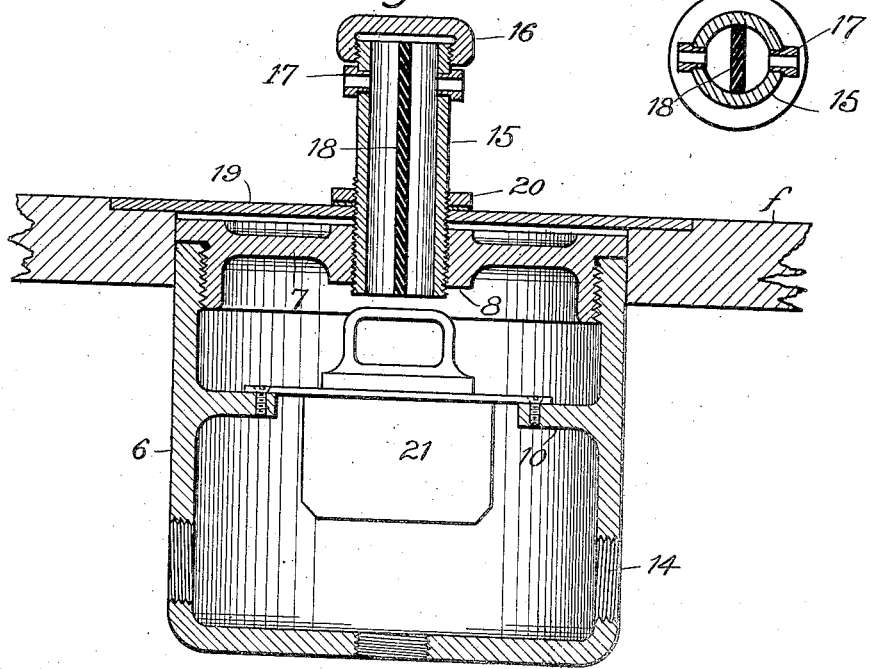
Witness:
Chas. H. Ebert
J. W. H. Clay
Inventors
Arthur Frantzen
William H. Rattenbury
By Paul Synnestvedt
Attorney.

No. 826,097. PATENTED JULY 17, 1906.
A. FRANTZEN & W. H. RATTENBURY.
CONDUIT OUTLET BOX.
APPLICATION FILED MAR. 24, 1903.
2 SHEETS—SHEET 2.
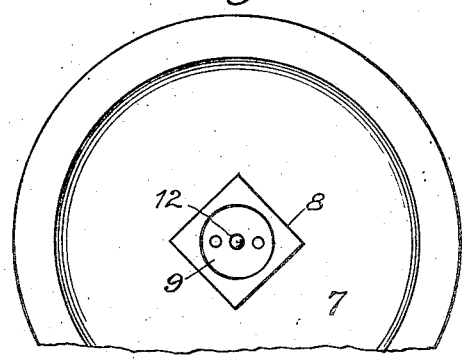
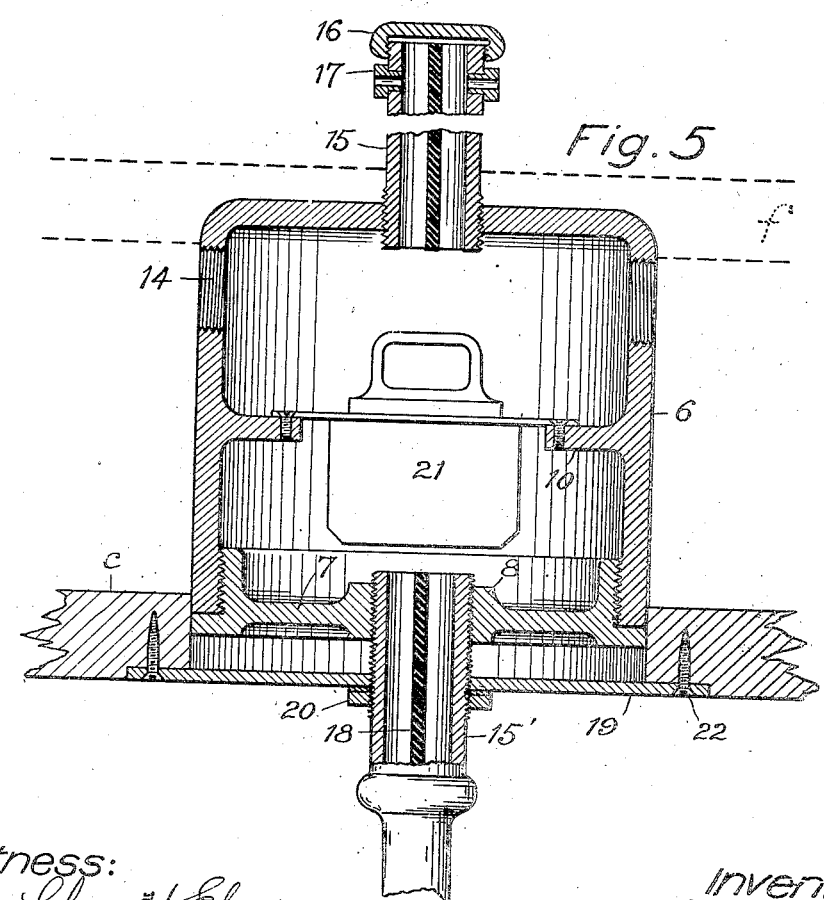

UNITED STATES PATENT OFFICE.

ARTHUR FRANTZEN AND WILLIAM H. RATTENBURY, OF CHICAGO, ILLINOIS.

CONDUIT OUTLET-BOX.

No. 826,097.  Specification of Letters Patent.  Patented July 17, 1906.

Application filed March 24, 1903. Serial No. 149,308.

*To all whom it may concern:*

Be it known that we, ARTHUR FRANTZEN and WILLIAM H. RATTENBURY, citizens of the United States, residing at Chicago, in the county of Cook and State of Illinois, have invented certain new and useful Improvements in Conduit Outlet-Boxes, of which the following is a specification.

Our invention relates particularly to the outlet connections for buried or hidden electric wires under floors and in walls, but is equally applicable to outlets for pipes or connections of any other kind. The objects of the invention are, to provide an outlet for leading electric wires from the mains buried under the floors or ceilings of buildings, &c., out through same for attachments in the room; to provide an outlet-box which will be water-tight and safe from causation of fire by contact of the ends of the wires therein; to provide a box which is easily accessible to repair the terminals therein, &c., and is conveniently formed to place under the floor or partition in position for future use; to provide an electrical box which is adjustable in position so that it need not be accurately set with relation to the floor line; to provide an outlet box which is readily attachable either to the floor or ceiling or wall of the building, and may be fixed in place therein; and to provide an outlet for the wires which insures their insulation and leads them out of the floors in such a position as to be protected so as not to be broken off or marred by blows upon the outlet support.

These objects, together with other advantages which will hereinafter appear, we attain by the construction and assembly of parts as illustrated in preferred form in the accompanying drawings, wherein—

Figure 1 is a central vertical section through the floor and one of our boxes placed therein for future use and hidden from sight. Figure 2 is a vertical central section of the box as it is arranged for use, showing the neck outlet holes for the wires. Figure 3 is a cross-section of the outlet tube or neck to the box. Figure 4 is a partial plan view of the box shown in Fig. 1. Figure 5 illustrates the mode of attaching the box to the ceiling and supporting it by a plate screwed to the ceiling, so that it may be adjustable with respect to the ceiling line, the same showing also its use for both floor and ceiling outlets at once.

One of the difficulties experienced in arranging this class of devices is to get the top of the outlet box in proper position with relation to the floor line; and for this purpose various devices have been made in which the box is in two parts which are adjustable with respect to each other whereby the top may be raised and lowered. And it has been the general custom to provide the top of the box with a fixed outlet pipe to lead the wires from the floor into the room, and these cannot be placed before laying the floor. It will be seen that we provide a device in which these difficulties are overcome by having the top of the box fixed and the box itself adjustable with relation to the floor plate, and the outlet tube adjustable in the top of the box and the plate.

In the accompanying drawings we have shown in Fig. 1 the way in which the box is ordinarily buried under the floor and marked for future use. The box proper, marked 6, has its top 7, screwed therein and made water-tight, and receptacle supports 10 therein. In its top it has a square hub 8, for convenience in screwing the top on, and has a screw plug 9, which may be provided with a sharp projection 12, in order that the position under the floor *f*, may be marked. This is done by first placing the box in its desired position, then fitting the floor plank over it in the position in which it is to go down and striking such plank immediately over the box. The spring of the wood causes the projection 12 to mark the under side of the plank. The plank can then be turned upside down and a small hole bored at the point of marking. This hole is subsequently fitted with a mark screw 13.

In Fig. 2 we have shown the box as prepared ready for use. The bushing or hub 8, is screw-threaded, and into this we insert a short pipe 15, adjustable in vertical position therein and passing also through a plate 19, designed to rest upon the floor. The tube 15 is locked in position with relation to the plate 19 by means of the nut 20. It is closed at the top with a cap 16 and has on one side or both sides, a small outlet nipple 17; and it may have disposed centrally of its interior a nonconductive partition 18, in order to more securely insulate the wires on the two sides of the same from each other. The box is provided with interiorly projecting shelves or studs 10, upon which may be placed the common receptacle 21, or any other device desired for arranging the electric terminals. The box is provided with a series of openings 14, to take the protecting pipe leading the main conduits to the box.

Figure 4 shows a plan view of the box in Fig. 1, or the bottom of the box as in Fig. 5 with the outlet tube 15' removed and the plug 9, inserted in its place.

As shown in Fig. 5, the outlet box is arranged in the ceiling c. In this case, when desired, the box may be supported upon the plate 19 by screws 22; it being understood that the box is adjustable in vertical position with relation to the plate 19, by means of the screw threads upon the neck 15, as before described. The box being between ceiling c' and floor f, both outlet tubes 15 and 15' may be used at once.

It will be seen that by this arrangement we avoid the necessity of cutting out any very accurately fitting opening in the floor, and also the necessity of adjusting the box itself with relation to the floor line before putting down the floor, and also that it is unnecessary to have the box made in two adjustable parts. The box then can be made perfectly water-tight and still adjustable for all necessary purposes, while the outlet tube 15 or 15' is rigid with the box and yet adjustable with relation thereto and with relation to the floor or ceiling plate. This box may be conveniently set in either the floor or the wall or the ceiling, as desired. In case outlets are to be made both through the floor and through the ceiling of the room below, the box may conveniently be arranged as shown in Fig. 5 with the floor outlet 15 inserted in the inverted bottom of the box, just as in Fig. 2 it is placed in the cover, and in the box cover, now inverted, may be placed a similar outlet tube 15'; this may if desired be the shank of a chandelier suspended from the ceiling. In case it is desired to support the box from the flooring above, rather than the ceiling below, the box will of course be placed in upright position, as in Fig. 2. The supports 10, being placed near the middle of the box, the receptacle 21 is supported thereon indifferently in either position.

The invertibility of this device enables it to be placed in any desired position and to serve two rooms at once, while the adjustability of the outlet tubes and the supporting plate with respect to the box renders the adjustment easy, while at the same time avoiding the necessity of the parts of the box being made adjustable and allows the cover or cap of the box to be fixed in position, and it can therefore be made water tight without any packing when desired, as well as very much cheapening the construction. The many other advantages of the device will be readily apparent to those familiar with their use.

Having thus described our invention and illustrated its use, what we claim, and desire to secure by Letters Patent, is the following:

1. A conduit outlet box comprising a body portion and a cover fixedly screwed in place therein, and an outlet tube threaded in the top of said box and adjustable in position therein, a floor plate and means to fasten and seal said tube at various positions in the floor plate, substantially as described.

2. A conduit outlet box having a fixed cover, an outlet neck adjustable therein, and a floor plate adjustable on the neck.

3. A conduit outlet box provided with screw sockets at both top and bottom, in combination with an outlet-tube engaging one of the sockets, said tube being adapted also to fit the other socket.

4. A conduit outlet box provided with screw sockets in both top and bottom, combined with a screw-threaded tube in one of said sockets, and a supporting plate adjustable in position on said tube.

5. A conduit outlet box provided with a screw socket in its top, an outlet tube threaded in the socket, a second socket for the tube in the bottom of the box, and projections from the wall near the middle of said box to support a receptacle in the box in either upright or inverted position, substantially as described.

6. The combination of a conduit outlet box having screw sockets in both top and bottom, threaded outlet tubes in said sockets and a supporting plate adjustable in position upon one of said outlet tubes, substantially as and for the purpose described.

7. A conduit outlet box having a fixed cover, a receptacle support therein, outlet tubes adjustably screwed into both top and bottom of the box and support or attaching plates adjustable upon one of said tubes.

8. An outlet box provided with means for marking its position under the flooring, comprising an adjustable plug in the cap of the box provided with a sharpened point thereon.

9. An electrical conduit outlet box having a fixed cover, a receptacle support projecting from the side, a threaded tube screwed in the cover and carrying a floor plate adjustable upon said screw threads and with relation to the top of the box.

10. An electric conduit box having a fixedly closed top thereon provided with an outlet tube, in combination with a floor plate and an adjustable connection between the floor plate and the top of the box by which to adjust the position of the box with respect to the floor boards, substantially as described.

11. An electric conduit outlet box having a closed top, combined with a floor plate separate from the box and an outlet tube adjustably screwed into the box top and said plate.

12. A conduit outlet box having a tight fitting top with an opening therein, an outlet tube screwed into the opening, and a floor plate screwed on said outlet tube and having means to lock it in place thereon.

In testimony whereof we have hereunto set our hands in the presence of the subscribed witnesses.

ARTHUR FRANTZEN.
WILLIAM H. RATTENBURY.

Witnesses:
PAUL CARPENTER,
EDWARD C. BURNS.